United States Patent
Kim

(10) Patent No.: US 12,233,775 B2
(45) Date of Patent: Feb. 25, 2025

(54) VEHICLE LIGHTING DEVICE AND OPERATING METHOD THEREOF

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,210

(22) Filed: Dec. 23, 2022

(65) Prior Publication Data

US 2023/0398926 A1  Dec. 14, 2023

(30) Foreign Application Priority Data

Jun. 8, 2022 (KR) .................. 10-2022-0069653

(51) Int. Cl.
- *B60Q 1/26* (2006.01)
- *B60Q 1/08* (2006.01)
- *B60Q 1/50* (2006.01)
- *G06V 20/58* (2022.01)

(52) U.S. Cl.
CPC .............. *B60Q 1/50* (2013.01); *B60Q 1/08* (2013.01); *G06V 20/58* (2022.01); *B60Q 2400/50* (2013.01)

(58) Field of Classification Search
CPC ........ B60Q 1/50; B60Q 1/08; B60Q 2400/50; G06V 20/58
See application file for complete search history.

(56) References Cited

U.S. PATENT DOCUMENTS

| | | | | |
|---|---|---|---|---|
| 4,458,446 | A * | 7/1984 | Mochida | G01S 15/88 49/31 |
| 6,111,580 | A * | 8/2000 | Kazama | G06F 3/017 715/863 |
| 6,271,745 | B1 * | 8/2001 | Anzai | G07C 9/37 340/5.23 |
| 6,459,387 | B1 * | 10/2002 | Kobayashi | B60Q 1/18 362/465 |
| 6,683,969 | B1 * | 1/2004 | Nishigaki | G06V 20/58 382/104 |
| 8,489,252 | B2 * | 7/2013 | Inou | G06V 40/19 701/1 |
| 8,936,195 | B1 * | 1/2015 | Chang | G06K 7/10831 235/462.24 |
| 9,494,938 | B1 * | 11/2016 | Kemler | G08G 1/202 |
| 9,845,043 | B1 * | 12/2017 | Webb | B60K 35/80 |
| 9,855,890 | B2 * | 1/2018 | James | B60Q 1/5035 |
| 9,904,375 | B1 * | 2/2018 | Donnelly | G05D 1/00 |
| 9,944,405 | B2 * | 4/2018 | Mouton | B64D 47/04 |
| 9,953,538 | B1 * | 4/2018 | Matthiesen | B60Q 1/346 |
| 9,958,870 | B1 * | 5/2018 | Graybill | G05D 1/02 |
| 9,975,649 | B1 * | 5/2018 | Ross | B64F 1/20 |
| 10,023,204 | B1 * | 7/2018 | Kim | B60Q 9/008 |
| 10,043,395 | B2 * | 8/2018 | Morel | H04N 9/31 |

(Continued)

*Primary Examiner* — Quang Pham
(74) *Attorney, Agent, or Firm* — DLA Piper LLP US

(57) ABSTRACT

A vehicle lighting device and an operating method thereof. In the vehicle lighting device and the operating method thereof, a controller selects image data based on information on a driving environment of a vehicle, sorts a target as a reference for recognizing light, and controls a light output unit to display a visual image based on the image data based on the sorted target.

9 Claims, 12 Drawing Sheets

(56) References Cited

U.S. PATENT DOCUMENTS

| | | | |
|---|---|---|---|
| 10,112,528 B1* | 10/2018 | Mazuir | B60Q 5/006 |
| 10,118,548 B1* | 11/2018 | Fields | G08G 1/005 |
| 10,134,280 B1* | 11/2018 | You | B60Q 1/525 |
| 10,173,577 B2* | 1/2019 | Albou | B60Q 1/02 |
| 10,189,402 B2* | 1/2019 | Asaoka | B60Q 1/44 |
| 10,239,440 B2* | 3/2019 | Asaoka | G06V 20/58 |
| 10,421,389 B2* | 9/2019 | Nagata | B60Q 1/28 |
| 10,497,178 B2* | 12/2019 | Cho | G06T 11/60 |
| 10,562,542 B1* | 2/2020 | Shannon | B60K 35/28 |
| 10,656,647 B2* | 5/2020 | Mangal | G05D 1/0088 |
| 10,665,106 B2* | 5/2020 | Choi | G05D 1/0214 |
| 10,688,915 B1* | 6/2020 | Rastoll | B60Q 1/28 |
| 10,706,719 B2* | 7/2020 | Zhang | G03B 29/00 |
| 10,752,218 B2* | 8/2020 | Turner | G01N 21/15 |
| 10,796,580 B2* | 10/2020 | Dellock | G05D 1/0214 |
| 10,814,840 B2* | 10/2020 | Kim | B60W 30/09 |
| 11,027,652 B2* | 6/2021 | Zafeirakis | B60R 1/12 |
| 11,267,397 B2* | 3/2022 | Mimura | B60Q 1/543 |
| 11,270,589 B2* | 3/2022 | Shimizu | B60K 35/00 |
| 11,346,685 B2* | 5/2022 | Goluguri | H04W 4/44 |
| 11,472,332 B1* | 10/2022 | Salter | B60Q 1/247 |
| 11,485,280 B2* | 11/2022 | Mimura | B60Q 1/46 |
| 11,560,154 B1* | 1/2023 | Gate | G01C 21/3614 |
| 11,587,438 B2* | 2/2023 | Nishimura | G08G 1/052 |
| 11,685,384 B2* | 6/2023 | Ratcliff | G06V 40/19 340/576 |
| 11,760,264 B2* | 9/2023 | Petrillo | B60Q 9/008 701/36 |
| 11,775,061 B1* | 10/2023 | Lutz | G06F 3/04845 345/156 |
| 12,049,219 B2* | 7/2024 | Benamar | B60W 30/09 |
| 2004/0193331 A1* | 9/2004 | Kashiwada | G02B 27/01 701/1 |
| 2004/0207519 A1* | 10/2004 | Tracy | B60Q 1/34 340/467 |
| 2005/0057941 A1* | 3/2005 | Pederson | F21S 10/06 362/542 |
| 2006/0006988 A1* | 1/2006 | Harter | B60Q 9/008 348/148 |
| 2007/0024461 A1* | 2/2007 | Pederson | F21V 33/0076 340/815.45 |
| 2008/0175012 A1* | 7/2008 | Shimaoka | B60Q 9/008 362/464 |
| 2008/0231435 A1* | 9/2008 | Lin | B60Q 1/48 340/435 |
| 2010/0277935 A1* | 11/2010 | Endo | B60Q 1/302 348/148 |
| 2010/0302020 A1* | 12/2010 | Lenneman | B60K 35/654 340/441 |
| 2012/0057749 A1* | 3/2012 | Takahashi | G08G 1/167 382/103 |
| 2012/0290132 A1* | 11/2012 | Kokubo | B25J 9/1666 700/250 |
| 2013/0058116 A1* | 3/2013 | Galbas | B60Q 1/48 362/512 |
| 2013/0130674 A1* | 5/2013 | De Wind | B60Q 1/2669 362/546 |
| 2013/0225289 A1* | 8/2013 | Yoshimitsu | A63F 13/00 463/31 |
| 2013/0300635 A1* | 11/2013 | White | H04N 13/383 345/7 |
| 2013/0326419 A1* | 12/2013 | Harada | G06F 3/04817 715/838 |
| 2014/0062685 A1* | 3/2014 | Tamatsu | G08G 1/005 340/425.5 |
| 2014/0241579 A1* | 8/2014 | Nonaka | G06V 20/58 382/103 |
| 2014/0282161 A1* | 9/2014 | Cash | G06F 3/017 715/769 |
| 2014/0300554 A1* | 10/2014 | Samuel | H04W 12/068 345/173 |
| 2014/0347179 A1* | 11/2014 | Fleszewski | G08C 17/02 340/468 |
| 2014/0347469 A1* | 11/2014 | Zhang | H04N 7/183 348/118 |
| 2014/0354753 A1* | 12/2014 | Takahashi | B41J 11/0025 347/218 |
| 2014/0354957 A1* | 12/2014 | Vermeirsch | G03B 21/13 353/30 |
| 2015/0002555 A1* | 1/2015 | Chi | G02F 1/1345 345/690 |
| 2015/0029314 A1* | 1/2015 | Reichow | H04N 13/388 348/51 |
| 2015/0035685 A1* | 2/2015 | Strickland | B60Q 9/008 340/901 |
| 2015/0042564 A1* | 2/2015 | Shiina | H04N 9/3164 345/158 |
| 2015/0042645 A1* | 2/2015 | Kawaguchi | G01S 7/4808 345/419 |
| 2015/0055099 A1* | 2/2015 | Kim | G03B 37/04 353/30 |
| 2015/0077235 A1* | 3/2015 | Pisz | G06F 3/017 340/426.23 |
| 2015/0081169 A1* | 3/2015 | Pisz | G06F 21/31 701/1 |
| 2015/0138222 A1* | 5/2015 | Imaizumi | H04N 9/3182 345/589 |
| 2015/0160540 A1* | 6/2015 | Kim | H04N 9/3185 353/121 |
| 2015/0161775 A1* | 6/2015 | Kim | G06F 3/1446 345/634 |
| 2015/0203023 A1* | 7/2015 | Marti | B60W 50/0097 340/425.5 |
| 2015/0228195 A1* | 8/2015 | Beaurepaire | B60Q 1/547 340/907 |
| 2015/0232018 A1* | 8/2015 | Augst | G09F 19/14 340/468 |
| 2015/0336502 A1* | 11/2015 | Hillis | G05D 1/0088 701/23 |
| 2015/0363986 A1* | 12/2015 | Hoyos | H04W 12/08 340/5.61 |
| 2015/0375672 A1* | 12/2015 | Takahashi | F21S 41/25 362/510 |
| 2016/0086033 A1* | 3/2016 | Molin | G06V 20/58 345/419 |
| 2016/0088276 A1* | 3/2016 | Lin | H04N 9/3194 348/207.1 |
| 2016/0132673 A1* | 5/2016 | Birk | G06F 21/30 726/19 |
| 2016/0144785 A1* | 5/2016 | Shimizu | B60K 35/60 340/435 |
| 2016/0161266 A1* | 6/2016 | Crawford | G01C 21/34 701/25 |
| 2016/0170487 A1* | 6/2016 | Saisho | G01C 21/3697 345/156 |
| 2016/0179094 A1* | 6/2016 | Sorokin | B60Q 1/549 701/23 |
| 2016/0259439 A1* | 9/2016 | Buttolo | G06F 3/04883 |
| 2016/0269456 A1* | 9/2016 | Ricci | B60K 35/00 |
| 2016/0272172 A1* | 9/2016 | Lee | B60T 7/22 |
| 2016/0272215 A1* | 9/2016 | Laine | G06V 20/597 |
| 2016/0311362 A1* | 10/2016 | Fendt | B60Q 1/085 |
| 2016/0370194 A1* | 12/2016 | Colijn | G08G 1/202 |
| 2016/0370866 A1* | 12/2016 | Hwang | G06F 3/04883 |
| 2017/0021282 A1* | 1/2017 | Comploi | G05D 1/0088 |
| 2017/0070711 A1* | 3/2017 | Grundhofer | H04N 9/3185 |
| 2017/0076606 A1* | 3/2017 | Gupta | B60Q 9/008 |
| 2017/0088035 A1* | 3/2017 | Williams | B60Q 1/0094 |
| 2017/0110096 A1* | 4/2017 | Kuehn | G03B 17/54 |
| 2017/0120803 A1* | 5/2017 | Kentley | B60Q 1/26 |
| 2017/0127027 A1* | 5/2017 | Naganuma | G09G 3/002 |
| 2017/0140651 A1* | 5/2017 | Lee | B60Q 1/324 |
| 2017/0144584 A1* | 5/2017 | Asaoka | B60Q 1/525 |
| 2017/0153714 A1* | 6/2017 | Gao | G05D 1/0088 |
| 2017/0155867 A1* | 6/2017 | Yokota | B60R 1/008 |
| 2017/0180689 A1* | 6/2017 | Morrison | H04N 9/3194 |
| 2017/0182934 A1* | 6/2017 | Arita | B60Q 1/545 |
| 2017/0192428 A1* | 7/2017 | Vogt | G01C 21/3461 |
| 2017/0225617 A1* | 8/2017 | Morimura | G06V 40/10 |

(56) References Cited

U.S. PATENT DOCUMENTS

| | | | |
|---|---|---|---|
| 2017/0237945 A1* | 8/2017 | Murar | B60Q 1/247 |
| | | | 348/148 |
| 2017/0246983 A1* | 8/2017 | Canonne | B60Q 1/085 |
| 2017/0249846 A1* | 8/2017 | Ignaczak | H04W 4/40 |
| 2017/0255093 A1* | 9/2017 | Fujita | G01S 13/931 |
| 2017/0259731 A1* | 9/2017 | Son | B60Q 1/48 |
| 2017/0267167 A1* | 9/2017 | Sakata | B60Q 1/247 |
| 2018/0004020 A1* | 1/2018 | Kunii | H04N 9/3179 |
| 2018/0012427 A1* | 1/2018 | Ricci | G01C 21/36 |
| 2018/0033306 A1* | 2/2018 | Kim | G06V 40/103 |
| 2018/0039273 A1* | 2/2018 | Delp | B60R 11/00 |
| 2018/0056854 A1* | 3/2018 | Kunii | G01S 17/04 |
| 2018/0065545 A1* | 3/2018 | McMahon | E05F 15/73 |
| 2018/0074495 A1* | 3/2018 | Myers | B60K 28/06 |
| 2018/0075565 A1* | 3/2018 | Myers | G05D 1/0088 |
| 2018/0079284 A1* | 3/2018 | Choi | G02F 1/0121 |
| 2018/0079463 A1* | 3/2018 | Pearce | B62J 45/412 |
| 2018/0082588 A1* | 3/2018 | Hoffman, Jr. | G08G 1/168 |
| 2018/0084234 A1* | 3/2018 | Yamamoto | H04N 9/3147 |
| 2018/0093604 A1* | 4/2018 | George | H04W 4/40 |
| 2018/0118099 A1* | 5/2018 | Kunii | B60Q 1/54 |
| 2018/0120686 A1* | 5/2018 | Hayashi | H04N 9/3167 |
| 2018/0136655 A1* | 5/2018 | Kim | B60N 2/0029 |
| 2018/0139426 A1* | 5/2018 | Ueda | H04N 9/3182 |
| 2018/0141484 A1* | 5/2018 | Haneda | B60Q 1/525 |
| 2018/0173237 A1* | 6/2018 | Reiley | G05D 1/0061 |
| 2018/0174160 A1* | 6/2018 | Jung | G08G 1/166 |
| 2018/0178717 A1* | 6/2018 | Kalanick | B60Q 1/0094 |
| 2018/0181365 A1* | 6/2018 | Winton | G06F 3/04845 |
| 2018/0186283 A1* | 7/2018 | Fischer | G07C 5/008 |
| 2018/0197022 A1* | 7/2018 | Fujikawa | G08G 1/0962 |
| 2018/0208208 A1* | 7/2018 | Chen | B60R 16/037 |
| 2018/0218605 A1* | 8/2018 | Mowatt | G08G 1/144 |
| 2018/0257547 A1* | 9/2018 | Suzuki | B60Q 1/547 |
| 2018/0260635 A1* | 9/2018 | Al-Dahle | G08G 1/09626 |
| 2018/0261081 A1* | 9/2018 | Suzuki | B60Q 1/525 |
| 2018/0284761 A1* | 10/2018 | Buttolo | H04W 4/023 |
| 2018/0284780 A1* | 10/2018 | McWhirter | G01S 7/4816 |
| 2018/0288371 A1* | 10/2018 | Nose | H04N 7/181 |
| 2018/0319325 A1* | 11/2018 | Tatara | B60Q 1/2696 |
| 2018/0339715 A1* | 11/2018 | Sweeney | B60W 40/10 |
| 2018/0365400 A1* | 12/2018 | Lopez-Hinojosa | G06V 20/59 |
| 2018/0373992 A1* | 12/2018 | Yin | G06V 10/25 |
| 2019/0016316 A1* | 1/2019 | Sung | B60T 7/22 |
| 2019/0026588 A1* | 1/2019 | Ryan | G06F 18/24133 |
| 2019/0051064 A1* | 2/2019 | Tojima | G05D 1/0246 |
| 2019/0061611 A1* | 2/2019 | Dellock | G08G 1/096775 |
| 2019/0064814 A1* | 2/2019 | Pandit | G06Q 50/40 |
| 2019/0065729 A1* | 2/2019 | Sun | G06F 3/04883 |
| 2019/0066509 A1* | 2/2019 | Dellock | B60Q 1/507 |
| 2019/0071075 A1* | 3/2019 | Mimura | G06V 20/58 |
| 2019/0078373 A1* | 3/2019 | Schulz | B60Q 1/0023 |
| 2019/0079161 A1* | 3/2019 | Sogabe | G01S 5/14 |
| 2019/0106050 A1* | 4/2019 | Kamhi | B60Q 1/247 |
| 2019/0160998 A1* | 5/2019 | Naserian | B60Q 1/1423 |
| 2019/0171218 A1* | 6/2019 | Hammond | G05D 1/0223 |
| 2019/0197430 A1* | 6/2019 | Arditi | G06N 20/00 |
| 2019/0205667 A1* | 7/2019 | Avidan | G06F 18/28 |
| 2019/0217863 A1* | 7/2019 | Jung | B60W 30/0956 |
| 2019/0220677 A1* | 7/2019 | Lipson | G06V 20/588 |
| 2019/0236938 A1* | 8/2019 | Ekladyous | B60Q 1/547 |
| 2019/0258057 A1* | 8/2019 | Hada | G02B 27/0101 |
| 2019/0270403 A1* | 9/2019 | Sobecki | G02B 19/0066 |
| 2019/0272484 A1* | 9/2019 | Saito | B60R 25/305 |
| 2019/0272749 A1* | 9/2019 | Saito | B60Q 1/268 |
| 2019/0351816 A1* | 11/2019 | Mouri | F21S 41/25 |
| 2019/0353495 A1* | 11/2019 | Dyer | G06Q 30/0278 |
| 2020/0026840 A1* | 1/2020 | Pathak | H04W 12/06 |
| 2020/0058222 A1* | 2/2020 | Miyahara | B60Q 1/525 |
| 2020/0062172 A1* | 2/2020 | Lujan | B60W 30/16 |
| 2020/0074847 A1* | 3/2020 | Wang | B60Q 1/547 |
| 2020/0086889 A1* | 3/2020 | Kaneko | G08G 1/166 |
| 2020/0089855 A1* | 3/2020 | Chou | H04L 9/32 |
| 2020/0101969 A1* | 4/2020 | Natroshvili | B60W 60/00276 |
| 2020/0108719 A1* | 4/2020 | Sumiyoshi | G09G 5/38 |
| 2020/0111370 A1* | 4/2020 | Dyer | B60W 60/00253 |
| 2020/0114813 A1* | 4/2020 | Lujan | B60Q 1/0035 |
| 2020/0156533 A1* | 5/2020 | Lee | B60Q 1/507 |
| 2020/0183157 A1* | 6/2020 | Suzuki | B60K 35/22 |
| 2020/0201325 A1* | 6/2020 | Parekh | G06F 9/50 |
| 2020/0226393 A1* | 7/2020 | Han | G06F 18/231 |
| 2020/0231085 A1* | 7/2020 | Kunii | B60Q 1/54 |
| 2020/0239029 A1* | 7/2020 | Kim | G06V 20/56 |
| 2020/0247434 A1* | 8/2020 | Kim | G08G 1/166 |
| 2020/0250553 A1* | 8/2020 | Tomaru | B60R 21/00 |
| 2020/0278693 A1* | 9/2020 | Vijaya Kumar | G06V 20/58 |
| 2020/0284872 A1* | 9/2020 | Fix | B60W 50/14 |
| 2020/0290643 A1* | 9/2020 | Ueda | B60W 50/10 |
| 2020/0349836 A1* | 11/2020 | Shibata | G08G 1/0965 |
| 2020/0353948 A1* | 11/2020 | Kusayanagi | B60R 21/00 |
| 2020/0355511 A1* | 11/2020 | Shimizu | G01C 21/3461 |
| 2021/0023994 A1* | 1/2021 | Watanabe | G06T 7/73 |
| 2021/0027625 A1* | 1/2021 | Jung | G08G 1/09626 |
| 2021/0039596 A1* | 2/2021 | Park | B60R 25/23 |
| 2021/0089638 A1* | 3/2021 | Seiler | G06F 3/011 |
| 2021/0162917 A1* | 6/2021 | Morimura | B60Q 1/507 |
| 2021/0162995 A1* | 6/2021 | Shalev-Shwartz | |
| | | | B60W 40/107 |
| 2021/0188159 A1* | 6/2021 | Fukutaka | B60Q 1/46 |
| 2021/0197863 A1* | 7/2021 | Hotta | B60K 35/50 |
| 2021/0201673 A1* | 7/2021 | Nguyen | G08G 1/0145 |
| 2021/0217304 A1* | 7/2021 | Shino | G08G 1/123 |
| 2021/0243361 A1* | 8/2021 | Ebata | H04N 23/634 |
| 2021/0306618 A1* | 9/2021 | Sugiyama | H04N 9/3141 |
| 2021/0314475 A1* | 10/2021 | Murata | G06T 5/73 |
| 2021/0347259 A1* | 11/2021 | Shibata | B60K 35/60 |
| 2021/0355738 A1* | 11/2021 | Jang | B60Q 1/32 |
| 2021/0394793 A1* | 12/2021 | Austin | G08G 1/0112 |
| 2022/0012988 A1* | 1/2022 | Avadhanam | G08G 1/166 |
| 2022/0097524 A1* | 3/2022 | Choi | B60Q 1/38 |
| 2022/0135079 A1* | 5/2022 | Ito | B60Q 1/507 |
| | | | 701/23 |
| 2022/0219599 A1* | 7/2022 | Mochizuki | B60Q 1/507 |
| 2022/0242407 A1* | 8/2022 | Shashua | B60W 30/0956 |
| 2022/0270475 A1* | 8/2022 | Sakurada | G08G 1/04 |
| 2022/0319316 A1* | 10/2022 | Sakurada | G08G 1/005 |
| 2022/0382087 A1* | 12/2022 | Wang | G02F 1/1313 |
| 2022/0402492 A1* | 12/2022 | Sakakura | G06V 20/584 |
| 2023/0126901 A1* | 4/2023 | Lee | G08G 1/095 |
| | | | 340/907 |
| 2023/0132045 A1* | 4/2023 | Arai | G06T 17/00 |
| | | | 382/299 |

* cited by examiner

| IMAGE | Use Case | PERSPECTIVE PROJECTION REFERENCE | IMAGE | Use Case | PERSPECTIVE PROJECTION REFERENCE |
|---|---|---|---|---|---|
|  | ICY ROAD MARK | DRIVER |  | CROSSWALK | PEDESTRIAN |
|  | COLLISION WARNING | DRIVER |  | ESCORT | PEDESTRIAN |
|  | WRONG ROAD WARNING | DRIVER |  | WELCOME | PEDESTRIAN |
| | LANE KEEPING WARNING | DRIVER | | SCHOOL ZONE | PEDESTRIAN |

VEHICLE LIGHTING DEVICE AND OPERATING METHOD THEREOF

CROSS-REFERENCE TO RELATED APPLICATIONS

This application claims priority under 35 U.S.C. § 119 to Korean Patent Application No. 10-2022-0069653, filed on Jun. 8, 2022, in the Korean Intellectual Property Office, the disclosure of which is incorporated herein by reference in its entirety.

TECHNICAL FIELD

The following disclosure relates to a vehicle lighting device and an operating method thereof, and more particularly, to a vehicle lighting device that selects a target as a reference for recognizing light and performs control so that light for displaying a visual image is output based on the selected target and an operating method thereof.

BACKGROUND

Vehicles are means of transportation that move users in a desired direction when users get on the vehicles.

A head lamp, a rear combination lamp, a turn indicator, an interior lamp, etc. may be installed as a lighting device in such a vehicle, and the lighting device of the vehicle may perform a function of securing visibility or transmitting a signal related to driving information to another vehicle.

Recently, in addition to the function of securing visibility or transmitting a signal related to driving information, a vehicle lighting device has been developed to perform a function of transmitting information to a driver, a driver of another vehicle, a pedestrian, and the like.

FIG. 1 is a view illustrating a vehicle that outputs light for displaying a visual image with a lighting device.

For example, as shown in FIG. 1, the vehicle lighting device may output light for displaying a visual image of a snowflake shape when a vehicle is driven on a frozen road.

As such, the vehicle lighting device may provide convenience to drivers and pedestrians by outputting light for displaying visual images related to various information, but is generally configured to provide a visual image based only on the driver.

However, in order for the information provided by a visual image output by the vehicle lighting device to be more efficiently utilized, a target for recognizing the visual image needs to be selected according to priority and the visual image needs to be provided based on the selected target.

SUMMARY

An exemplary embodiment of the present invention is directed to providing a vehicle lighting device capable of outputting light for displaying a visual image to provide various information to a target, and an operating method thereof.

Another exemplary embodiment of the present invention is directed to providing a vehicle lighting device capable of sorting a target for recognizing a visual image and outputting light for displaying a visual image based on the sorted target, and an operating method thereof.

Another exemplary embodiment of the present invention is directed to providing a vehicle lighting device capable of selecting a target for recognizing a visual image according to priority and outputting light for displaying a visual image based on the target according to the highest priority, and an operating method thereof.

The problems of the present invention are not limited to the problems mentioned above, and other problems not mentioned will be apparently understood by those skilled in the art from the following description.

In one general aspect, an operating method of a vehicle lighting device includes: an observation operation in which information on a driving environment of a vehicle is observed with an observation unit; a selecting operation in which a controller receives the information and selects image data regarding a visual image based on the information; and a control operation in which the controller controls a light output unit to output light for displaying a visual image based on the image data.

The control operation may include a sorting operation in which the controller sorts a target as a reference for recognizing the light; a determining operation in which the controller determines a direction in which the target looks at the light; a setting operation in which the controller sets a vanishing point at a point spaced apart from the target by a predetermined distance in the direction; and a control operation in which the controller adjusts the light output unit so that the visual image is projected in perspective from the target toward the vanishing point.

In the sorting operation, the controller may sort the driver as the target, but when at least one pedestrian is located within a predetermined distance from the vehicle, the controller may sort the pedestrian, instead of the driver, as the target.

The sorting operation may include: a classification operation in which the controller, when a plurality of pedestrians are located adjacent to the vehicle, classifies the plurality of pedestrians according to priority; and a choosing operation in which the controller selects a highest priority pedestrian having a highest priority, among the plurality of pedestrians classified according to the priority, as the target.

In the classifying operation, when the plurality of pedestrians form a plurality of groups, the controller may give priority to a group including a larger number of the plurality of pedestrians, and in the choosing operation, the controller may determine any one of the plurality of pedestrians included in the group belonging to the highest priority, as the highest priority pedestrian.

In the classification operation, when the plurality of groups includes the same number of the plurality of pedestrians, the controller may give priority to a group including the elderly and weak.

In another general aspect, an operating method of a vehicle lighting device includes: an observation operation in which information on a driving environment of a vehicle is observed with an observation unit; a selecting operation in which a controller receives the information and selects image data regarding a visual image based on the information; an input operation in which the controller receives direction information regarding a direction in which the visual image is to be projected in perspective; and a control operation in which the controller controls a light output unit to output light for displaying a visual image to be projected in perspective based on the image data and the direction information.

In the control operation, the controller may control the light output unit so that the visual image is rotated by a predetermined angle to be displayed according to the direction in which the visual image is projected in perspective.

In the control operation, the controller may control the light output unit so that the visual image displayed at a short distance is displayed to be brighter than the visual image displayed at a distance, when projected in perspective.

In another general aspect, a vehicle lighting device includes: an observation module observing information on a driving environment of a vehicle; a selecting module for a controller to receive the information and select image data regarding a visual image based on the information; and a control module for the controller to control a light output unit to output light for displaying a visual image based on the image data, wherein the control module includes: a sorting module for the controller to sort a target as a reference for recognizing the light; a determining module for the controller to determine a direction in which the target looks at the light; a setting module for the controller to set a vanishing point at a point spaced apart from the target by a predetermined distance in the direction; and an adjusting module for the controller to adjust the light output unit so that the visual image is projected in perspective from the target toward the vanishing point.

The sorting module may sort the driver as the target, and when at least one or more pedestrians are located within a predetermined distance from the vehicle, the sorting module may sort the pedestrian, instead of the driver, as the target.

Other features and aspects will be apparent from the following detailed description, the drawings, and the claims.

DETAILED DESCRIPTION OF EXEMPLARY EMBODIMENTS

Figure 1:
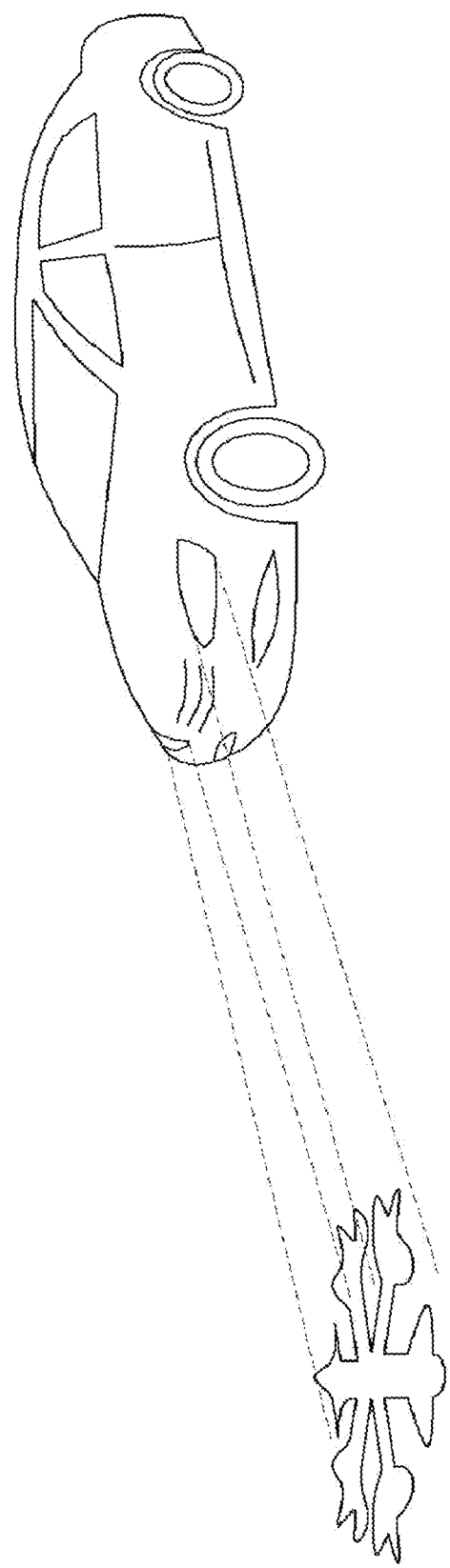
FIG. 1 is a view illustrating a vehicle that outputs light for displaying a visual image to a lighting device.

Hereinafter, exemplary embodiments of the present invention will be described in detail with reference to the accompanying drawings such that those skilled in the art may easily put the invention into practice. The invention may be embodied in various forms and is not limited to the exemplary embodiments which are described below. For the purpose of clear description of the invention, parts which are not described are omitted and like parts in the specification are referenced by like reference numerals.

In the entire specification, when it is mentioned that an element is "connected" to another element, this phrase includes a case in which both elements are "directly connected to each other" and a case in which both elements are "indirectly connected to each other" with still another element interposed therebetween.

In the entire specification, when it is mentioned that an element is located "on" another element, this phrase includes a case in which an element comes in contact with another element and a case in which still another element is present between both elements.

In the entire specification, when it is mentioned that an element "includes" another element, this means that the element may further include still another element without excluding still another element unless oppositely described. Terms, "about", "substantially", and the like indicating degrees, which are used in the entire specification when manufacturing errors and material-allowable errors specific to the mentioned meaning are given, are used to prevent an unconscientious infringer from improperly using the disclosed details. Terms such as "step of doing" or "step of" indicating degrees, which are used in the entire specification do not mean "step for".

Hereinafter, exemplary embodiments of the present invention will be described in detail with reference to the accompanying drawings and the content to be described below. However, the present invention is not limited to the exemplary embodiments described herein and may be embodied in other forms. Like reference numerals refer to like elements throughout.

Hereinafter, an operating method of a vehicle lighting device according to an exemplary embodiment of the present invention will be described.

FIG. 1 is a view illustrating a vehicle that outputs light for displaying a visual image with a lighting device.

Referring to FIG. 1, the operating method of a vehicle lighting device includes an observation operation S100, a selecting operation S200, and a control operation S300.

First, the observation operation S100 will be described.

The observation operation S100 is an operation in which information on a driving environment of the vehicle is observed with the observation unit.

For example, an observation unit configured to include a camera, a radar, a lidar, and an ultrasonic sensor may observe information on a driving environment of a vehicle, and the observed information may include lanes, other vehicles, pedestrians, traffic signals, roads, structures, landmarks, animals, and the like.

Next, the selecting operation S200 will be described.

The selecting operation S200 is an operation in which a controller receives information observed by the observation unit, and selects image data regarding a visual image based on the received information.

The controller may include a conventional computer or the like, and may store a plurality of image data.

Figure 3:
FIG. 3 is a view illustrating examples of visual images according to image data stored in a controller.
Figure 3:
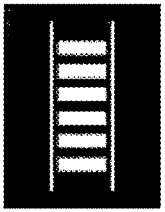
Figure 3:
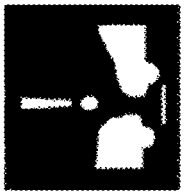
Figure 3:
Figure 3:
Figure 3:
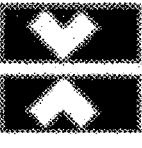

FIG. 3 is a view illustrating examples of visual images according to image data stored in a controller.

For example, referring to FIG. 3, the controller may store image data corresponding to various cases, such as a case in which the vehicle is traveling on an icy road, a case in which a crosswalk is located in a direction in which the vehicle is traveling, and each image data may be output as light for displaying a visual image by the light output unit.

In this case, the light output unit may be a lighting device of a vehicle, such as a head lamp.

When the controller receives information on a driving environment of the vehicle observed by the observation unit, the controller selects image data corresponding to the driving environment from among the stored image data.

Next, the control operation S300 will be described.

The control operation S300 is an operation in which the controller controls the light output unit to output light for displaying a visual image based on the image data.

Figure 2:
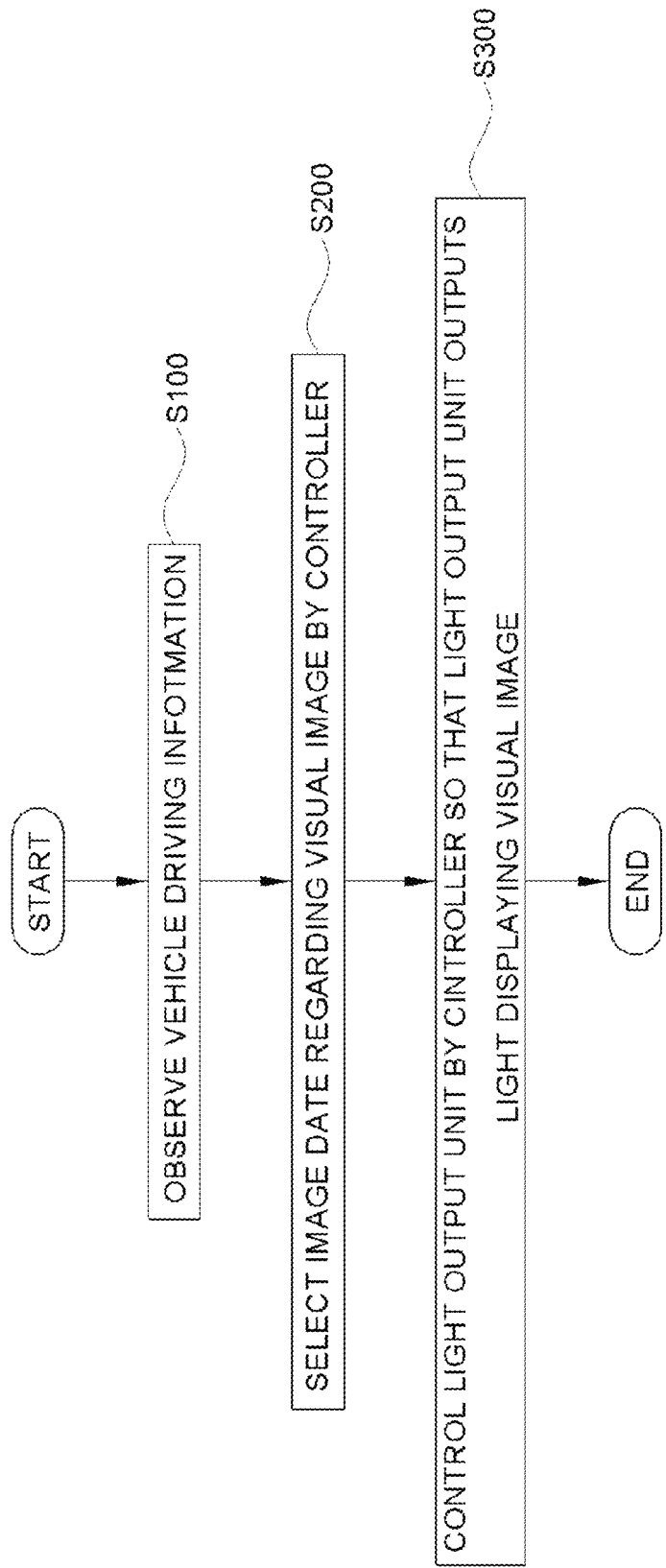
FIG. 2 is a flowchart illustrating an operating method of a vehicle lighting device according to an exemplary embodiment of the present invention.
Figure 4:
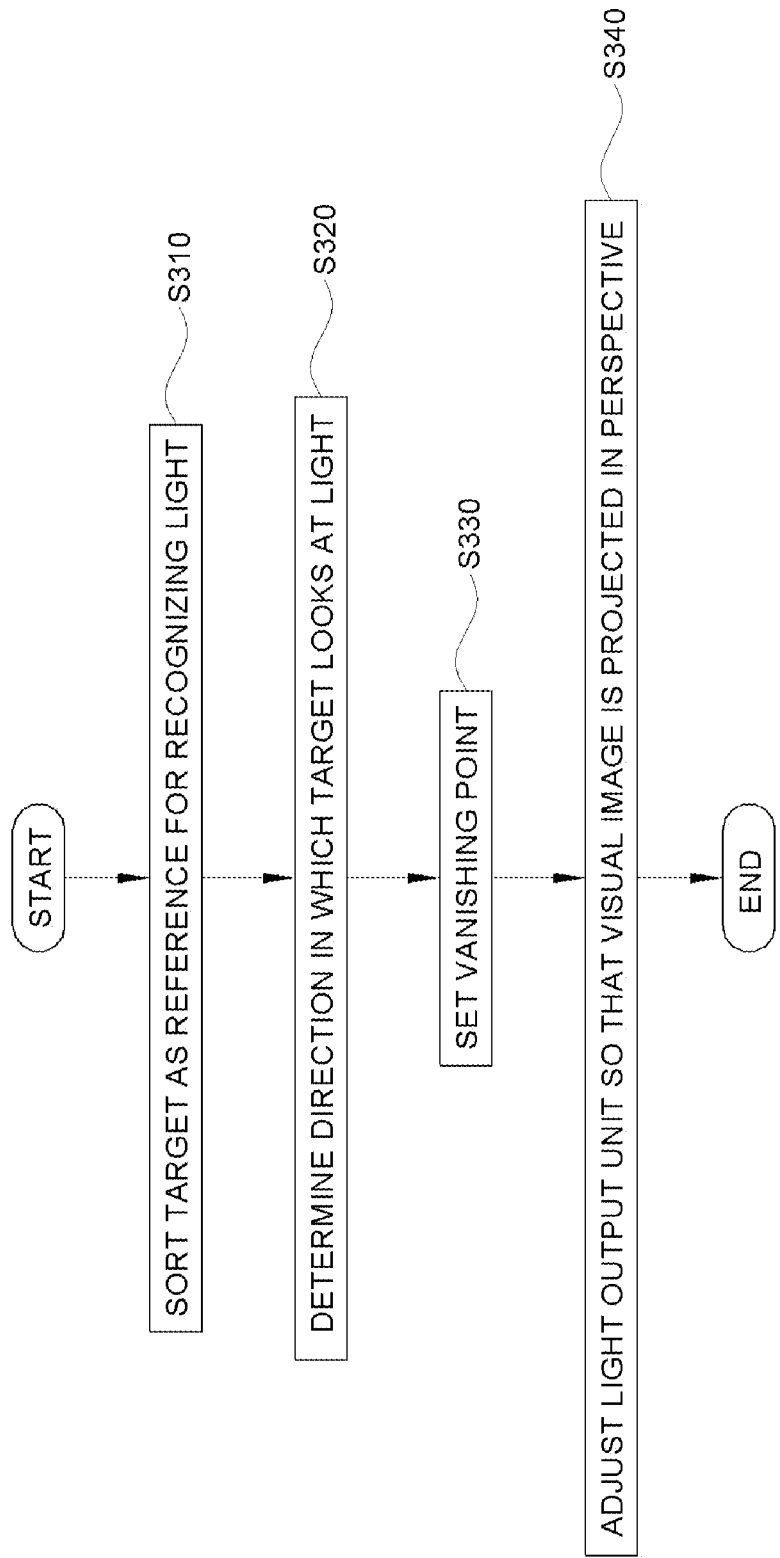
FIG. 4 is a flowchart illustrating a control operation of FIG. 2.

FIG. 4 is a flowchart illustrating the control operation of FIG. 2.

Referring to FIG. 4, the control operation S300 includes a sorting operation S310, a determining operation S320, a setting operation S330, and an adjusting operation S340.

The sorting operation S310 is an operation in which the controller sorts a target (hereinafter referred to as a target) as a reference for recognizing light.

FIG. 5 is a view illustrating that a visual image is output as light according to a target serving as a reference for recognizing light.

Figure 5A:
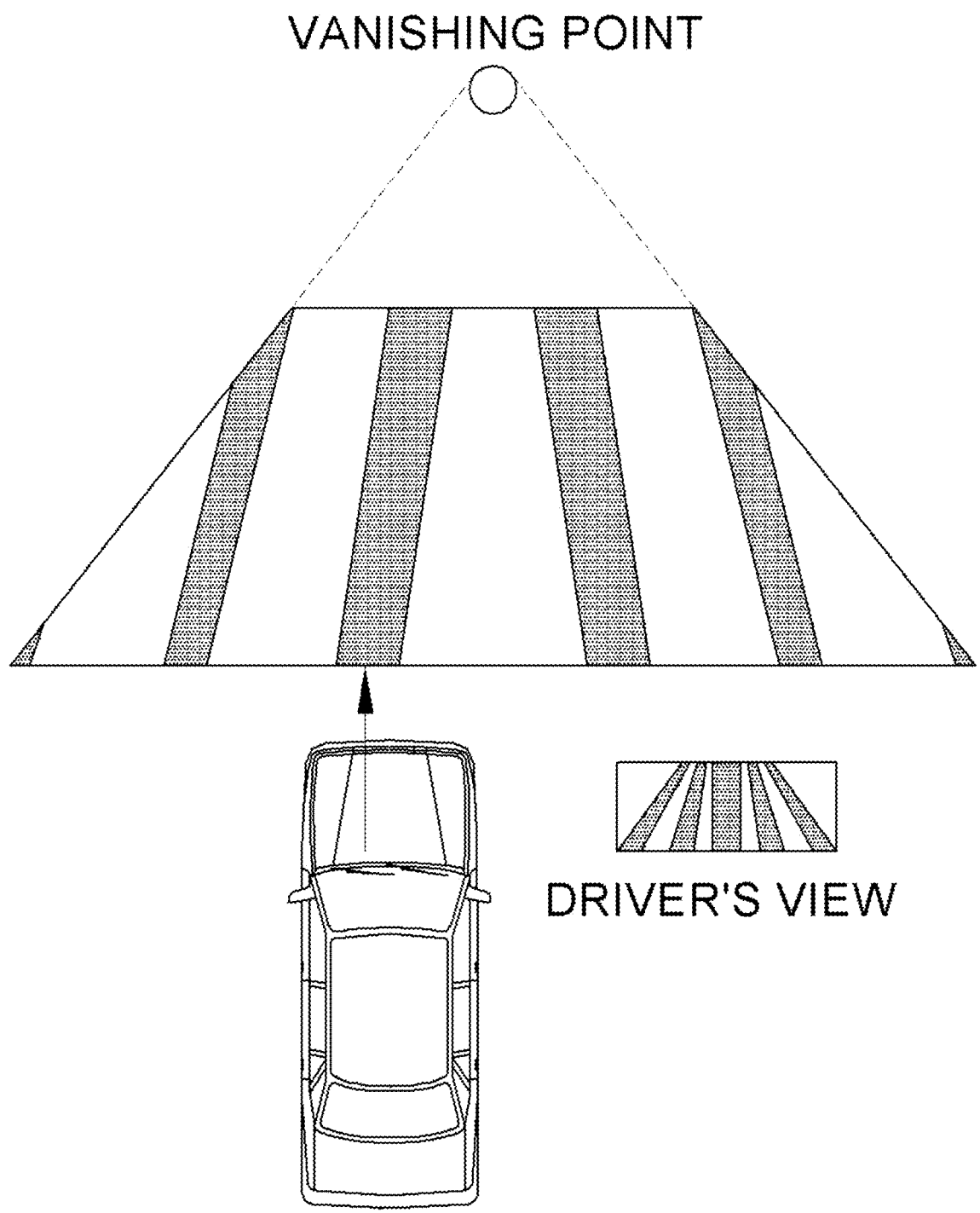
FIGS. 5A and 5B are views illustrating that a visual image is output as light according to a target as a reference for recognizing light.

For example, as shown in FIG. 5A, the controller may sort the driver as a target so that the light output unit outputs light for displaying a visual image based on the driver.

Figure 5B:
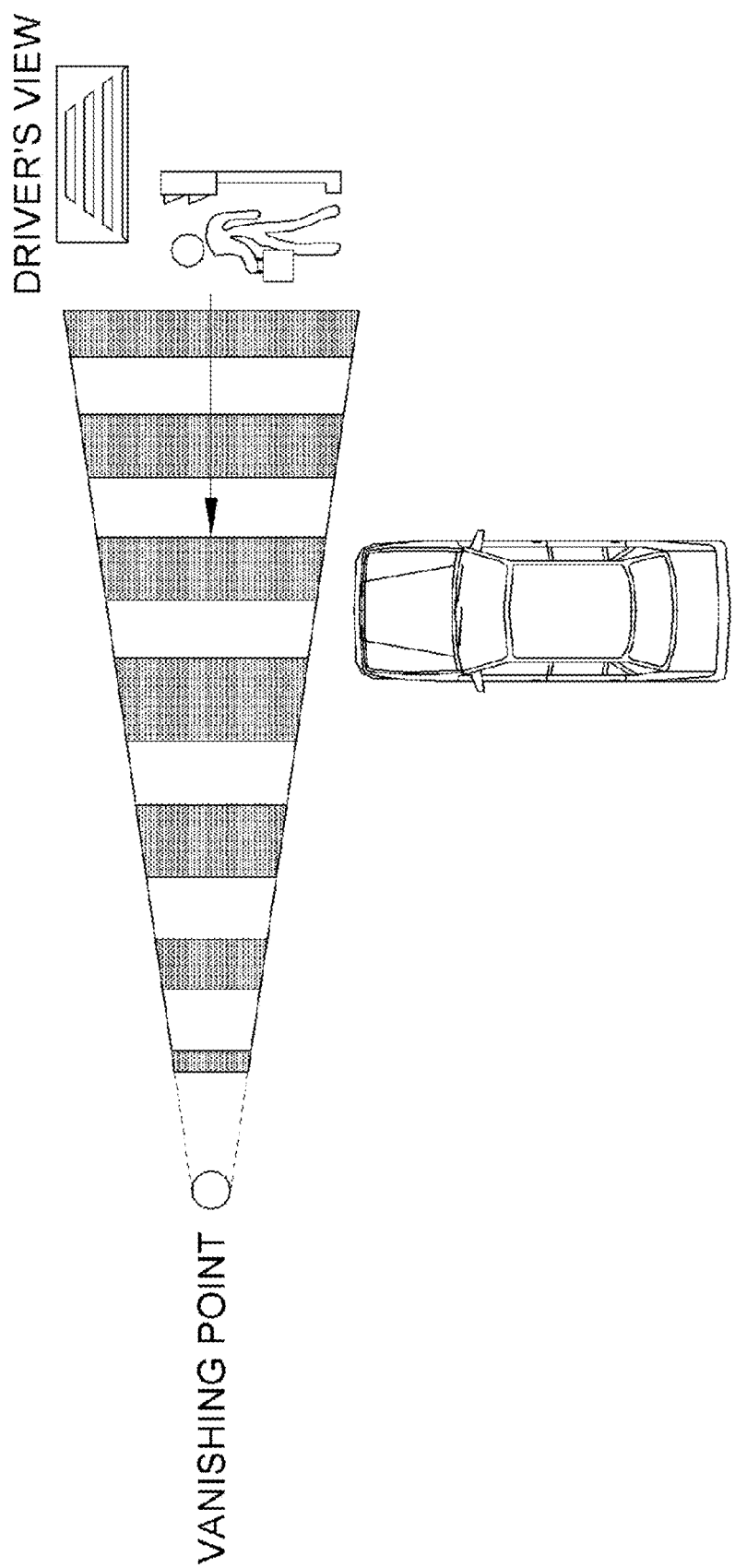

Meanwhile, when at least one pedestrian is located within a predetermined distance from the vehicle, the controller may sort the pedestrian as a target so that the light output unit outputs light for displaying a visual image based on the pedestrian, instead of the driver, as shown in FIG. 5B.

Figure 6:
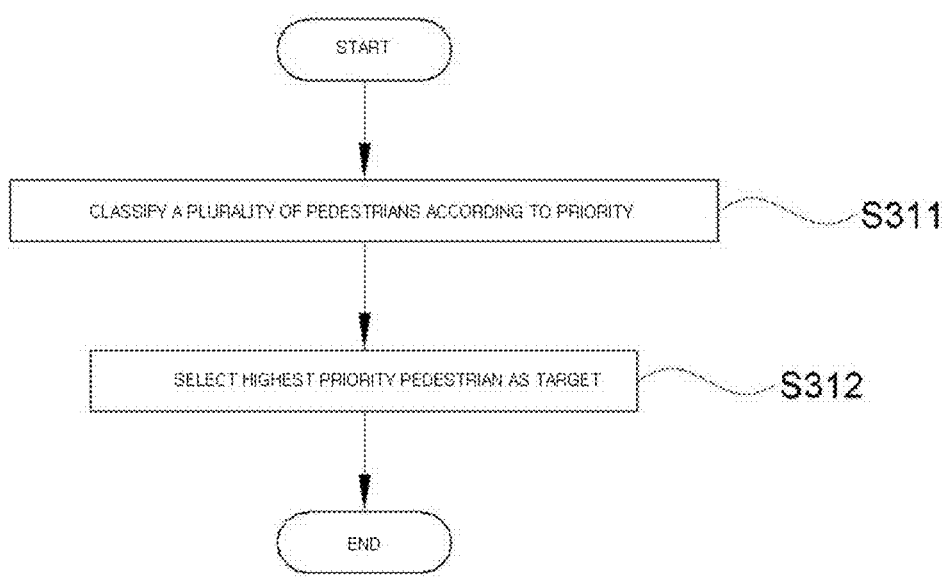
FIG. 6 is a flowchart illustrating a sorting operation of FIG. 4.

FIG. 6 is a flowchart illustrating the sorting operation of FIG. 4.

Referring to FIG. 6, the sorting operation S310 may include a classification operation S311 and a choosing operation S312.

The classification operation S311 is an operation in which the controller classifies a plurality of pedestrians according to priority when the plurality of pedestrians are located adjacent to the vehicle.

Figure 7:
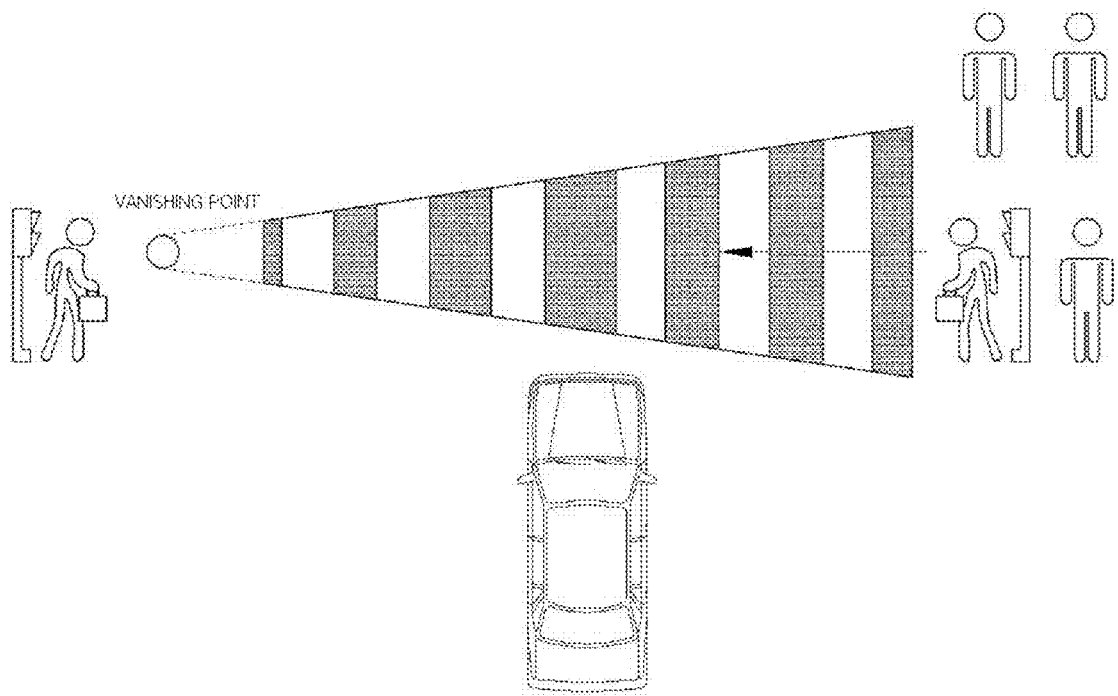
FIG. 7 is a view illustrating that a visual image is output as light based on a group including a larger number of a plurality of pedestrians.

FIG. 7 is a view illustrating that a visual image is output as light based on a group including a larger number of a plurality of pedestrians.

For example, as shown in FIG. 7, when a plurality of pedestrians form a plurality of groups, the controller may give priority to a group including a larger number of a plurality of pedestrians, so that the light output unit may output light for displaying a visual image based on the pedestrians having priority.

Figure 8:
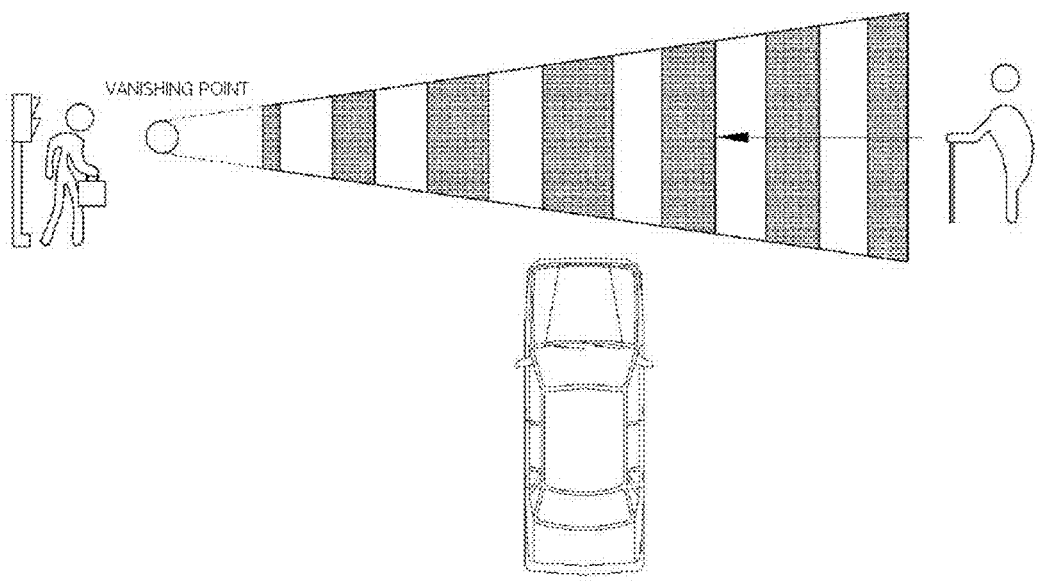
FIG. 8 is a view illustrating that a visual image is output as light based on a group including the elderly and weak.

FIG. 8 is a view illustrating that a visual image is output as light based on a group including the elderly and weak.

For another example, as shown in FIG. 8, when the plurality of groups includes the same number of a plurality of pedestrians, the controller may give priority to a group including the elderly and weak, so that the light output unit may output light for displaying a visual image based on pedestrians including the elderly and weak.

The choosing operation S312 is an operation in which the controller selects the highest priority pedestrian having the highest priority among a plurality of pedestrians classified according to the priority.

For example, as shown in FIG. 7, when priority is given to a group including a larger number of a plurality of pedestrians, any one of the plurality of pedestrians included in the group belonging to the highest priority may be determined as the highest priority pedestrian in the choosing operation S312.

In another example, as shown in FIG. 8, when priority is given to the group including the elderly and weak, the elderly and weak may be determined as the highest priority pedestrian in the choosing operation S312.

The determining operation S320 is an operation in which the controller determines a direction in which a target looks at the light after the target is sorted in the sorting operation S310.

The setting operation S330 is an operation in which a vanishing point is set at a point spaced apart by a predetermined distance from the target selected in the sorting operation S310 in a direction in which the target will look at the light.

The adjusting operation S340 is an operation in which the light output unit is adjusted so that the visual image is projected in perspective from the target toward the vanishing point.

Meanwhile, in the control operation S300, the controller may control the light output unit so that the visual image is rotated by a predetermined angle to be displayed according to the direction in which the visual image is projected in perspective.

Figure 9:
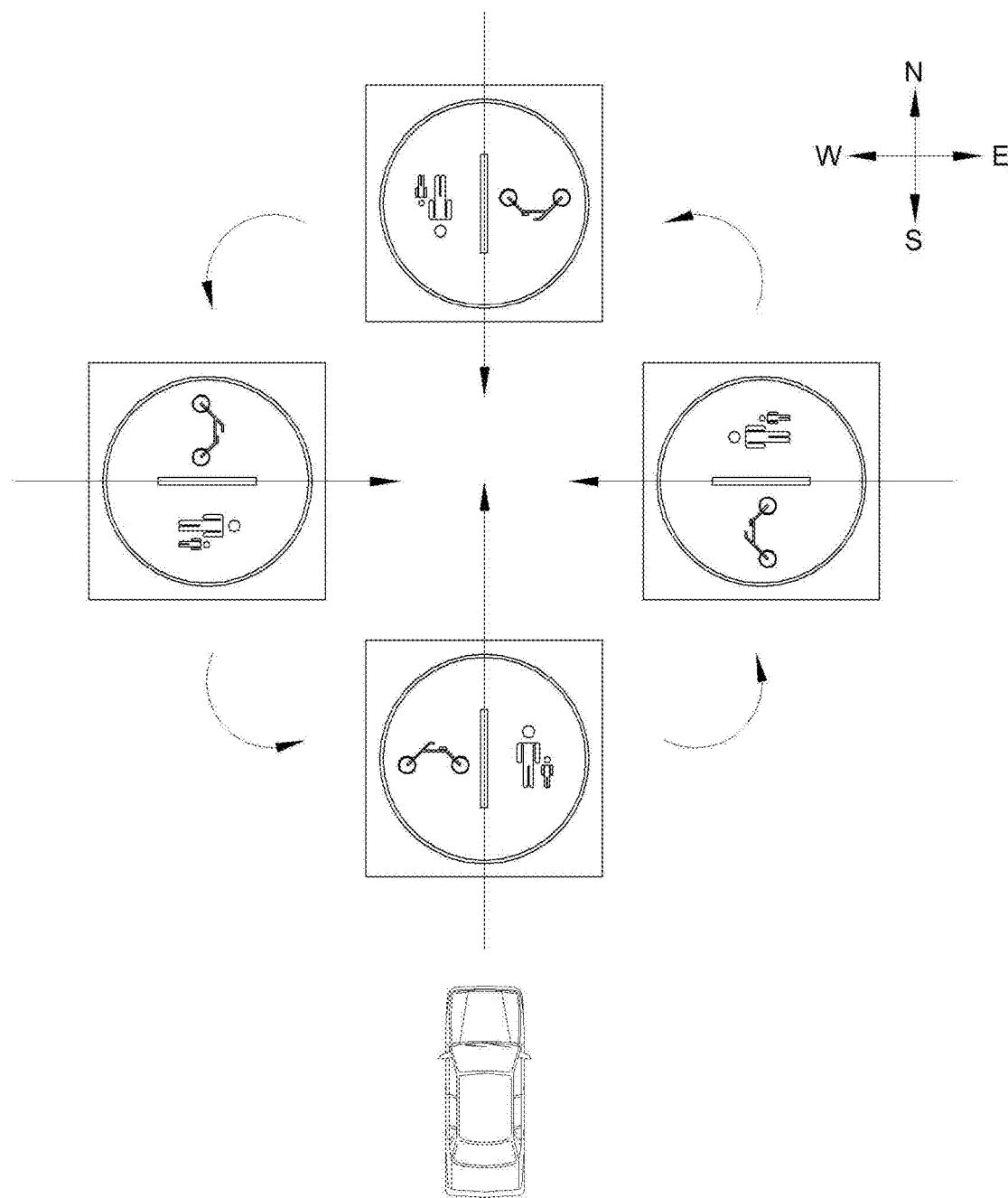
FIG. 9 is a view illustrating a visual image displayed by rotating a predetermined angle according to a direction in which the visual image is projected in perspective.

FIG. 9 is a view illustrating a visual image is rotated by a predetermined angle to be displayed according to a direction in which the visual image is projected in perspective.

For example, as shown in FIG. 9, the visual image output by the light output unit may be rotated by a predetermined angle to be displayed according to the perspective projection direction thereof.

In addition, when the visual image is projected in perspective in the control operation S300, the controller may control the light output unit so that a visual image displayed at a short distance is displayed to be brighter than a visual image displayed at a distance.

Figure 10:
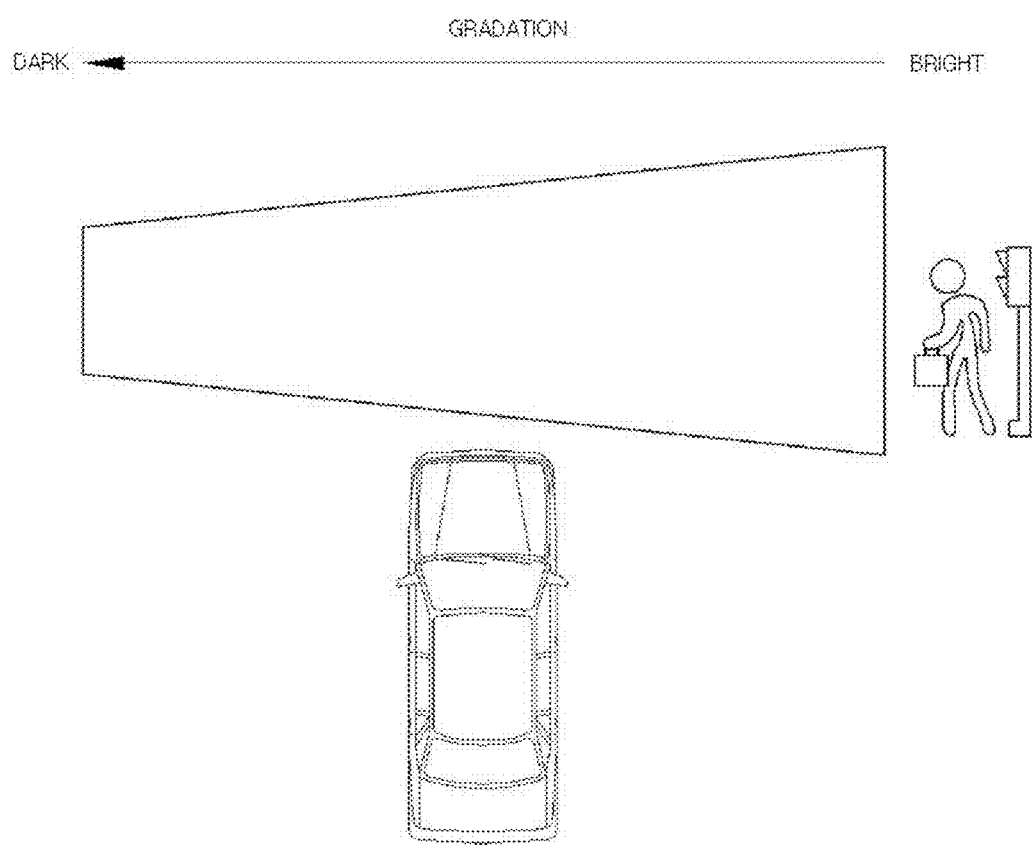
FIG. 10 is a view illustrating that a visual image displayed at a short distance is projected in perspective to be displayed to be brighter than a visual image displayed at a long distance.

FIG. 10 is a view illustrating that a visual image displayed at a short distance is projected in perspective to be displayed to be brighter than a visual image displayed at a long distance.

For example, as shown in FIG. 10, when a visual image is projected in perspective on a pedestrian, the controller may control the light output unit so that a visual image displayed at a short distance from the pedestrian is displayed to be brighter than a visual image displayed at a long distance from the pedestrian.

Hereinafter, an operating method of a vehicle lighting device according to another exemplary embodiment of the present invention will be described.

Figure 11:
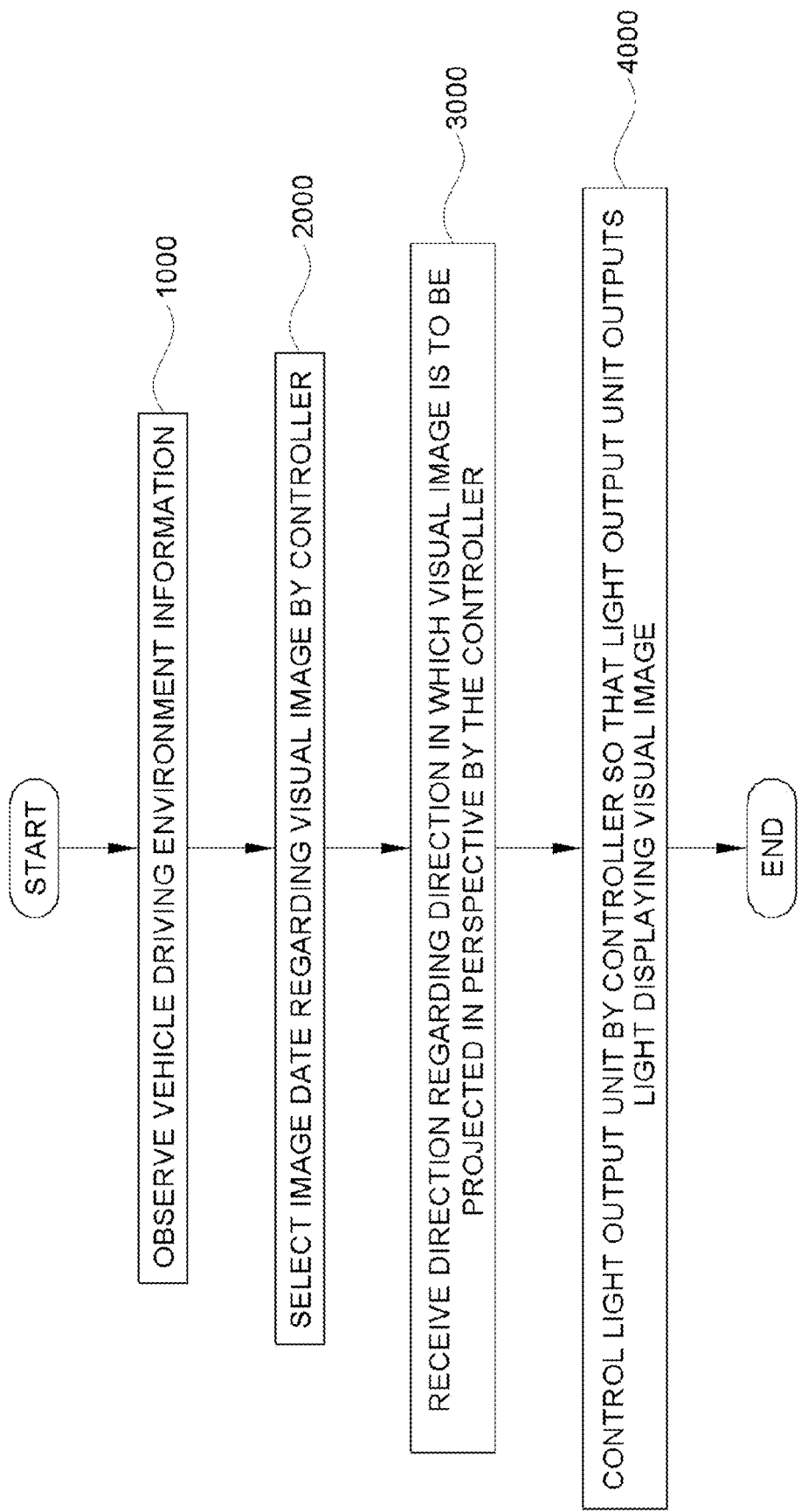
FIG. 11 is a flowchart illustrating an operating method of a vehicle lighting device according to another exemplary embodiment of the present invention.

FIG. 11 is a flowchart illustrating an operating method of a vehicle lighting device according to another exemplary embodiment of the present invention.

Referring to FIG. 11, an operating method of a vehicle lighting device according to another exemplary embodiment of the present invention includes an observation operation S1000, a selecting operation S2000, an input operation S3000, and a control operation S4000.

First, the observation operation S1000 will be described.

The observation operation S1000 is an operation of observing information on a driving environment of a vehicle.

Since the observation operation S1000 has the same configuration as that of the observation operation S100 described above, a description thereof will be omitted.

Next, the selecting operation S2000 will be described.

The selecting operation S2000 is an operation in which the controller receives information on a driving environment of a vehicle and selects image data regarding a visual image based on the received information.

Since the selecting operation S2000 has the same configuration as that of the selecting operation S200 described above, a description thereof will be omitted.

Next, the input operation S3000 will be described.

The input operation S3000 is an operation in which the controller receives direction information regarding a direction in which a visual image is to be projected in perspective.

Specifically, when a driver or the like presses or operates a multi-function switch, a button key, or the like, the controller may receive information on a direction in which a visual image is to be projected in perspective.

The information on the direction in which the visual image is to be projected in perspective may include information on a target as a reference for recognizing light, a direction in which the target will look at the light, a location of a vanishing point, and the like.

Next, the control operation S4000 will be described.

The control operation S4000 is an operation in which the controller controls the light output unit to project in perspective light for displaying a visual image to be output based on the image data and direction information.

Specifically, in the control operation S4000, the controller may control the light output unit so that the visual image corresponding to the image data selected in the selecting operation S2000 is projected in perspective and output as light according to the direction information input in the input operation S3000.

Meanwhile, in the control operation S4000 of the operating method of the vehicle lighting device according to another exemplary embodiment of the present invention, the controller may control the light output unit so that the visual image is rotated by a predetermined angle to be output according to the perspective projection direction of the visual image, and the controller may control the light output unit so that a visual image displayed at a short distance is displayed to be brighter than a visual image displayed at a long distance when the visual image is projected in perspective.

Hereinafter, a vehicle lighting device using the operating method of the vehicle lighting device according to an exemplary embodiment of the present invention will be described.

The vehicle lighting device includes an observation module, a selecting module, and a control module.

First, the observation module will be described.

The observation module observes information on a driving environment of a vehicle by an observation unit.

For example, an observation unit configured to include a camera, a radar, a lidar, and an ultrasonic sensor may observe information on a driving environment of a vehicle, and the observed information may include lanes, other vehicles, pedestrians, traffic signals, roads, structures, landmarks, animals, and the like.

Next, the selecting module will be described.

The selecting module allows the controller to receive the information observed by the observation unit and select image data regarding the visual image based on the received information.

The controller may include a conventional computer or the like, and may store a plurality of image data.

The controller may store image data corresponding to various cases, such as a case in which the vehicle is traveling on an icy road, a case in which a crosswalk is located in a direction in which the vehicle is traveling, and each image data may be output as light for displaying a visual image by the light output unit.

In this case, the light output unit may be a lighting device of a vehicle, such as a head lamp.

When the controller receives information on a driving environment of the vehicle observed by the observation unit, the controller selects image data corresponding to the driving environment from among the stored image data.

Next, the control module will be described.

The control module allows the controller to control the light output unit so that the light output unit outputs light for displaying a visual image based on the image data.

Such a control module includes a sorting module, a determining module, a setting module, and an adjusting module.

The sorting module allows the controller to sort a target (hereinafter referred to as a target) as a reference for recognizing light.

For example, the controller may sort the driver so that the light output unit outputs light for displaying a visual image based on the driver.

Meanwhile, when at least one pedestrian is located within a predetermined distance from the vehicle, the controller may sort the pedestrian as a target so that the light output unit outputs light for displaying a visual image based on the pedestrian, instead of the driver.

The sorting module may include a classification module and a choosing module.

The classification module allows the controller to classify a plurality of pedestrians according to priority when the plurality of pedestrians is located to be adjacent to the vehicle.

For example, when a plurality of pedestrians form a plurality of groups, the controller may give priority to a group including a larger number of a plurality of pedestrians, so that the light output unit may output light for displaying a visual image based on the pedestrians having priority.

For another example, when the plurality of groups includes the same number of a plurality of pedestrians, the controller may give priority to a group including the elderly and weak, so that the light output unit may output light for displaying a visual image based on pedestrians including the elderly and weak.

The choosing module allows the controller to select the highest priority pedestrian having the highest priority among a plurality of pedestrians classified according to the priority.

For example, when priority is given to a group including a larger number of a plurality of pedestrians, the choosing module may determine any one of the plurality of pedestrians included in the group belonging to the highest priority as the highest priority pedestrian.

As another example, when priority is given to the group including the elderly and weak, the choosing module may determine the elderly and weak as the highest priority pedestrian.

The determining module allows the controller to determine a direction in which a target will look at light after the target is sorted by the sorting module.

The setting module sets a vanishing point at a point spaced apart by a predetermined distance from the target sorted by the sorting module in a direction in which the target will look at the light.

The adjusting module adjusts the light output unit so that the visual image is projected in perspective from the target toward the vanishing point.

Meanwhile, in the control module, the controller may control the light output unit so that the visual image is rotated by a predetermined angle to be displayed according to the perspective projection direction of the visual image.

For example, the visual image output by the light output unit may be rotated by a predetermined angle to be displayed according to the perspective projection direction thereof.

In addition, in the control module, when the visual image is projected from the perspective in the control module, the controller may control the light output unit so that a visual image displayed at a short distance is displayed to be brighter than a visual image displayed at a long distance.

For example, when a visual image is projected in perspective for the pedestrian, the controller may control the light output unit so that a visual image displayed at a short distance from the pedestrian is displayed to be brighter than a visual image displayed at a long distance from the pedestrian.

As such, in the operating method of the vehicle lighting device according to the present invention, since the controller selects image data based on information on the driving environment of the vehicle and the light output unit outputs light for displaying a visual image based on the selected image data, an effect of providing various information to the target may be provided.

In addition, since the controller sorts a target as a reference for recognizing light, and controls the light output unit to output light for displaying a visual image based on the sorted target, information provided by the visual image may be effectively transmitted to the target.

In addition, since the controller controls the light output unit to output light for displaying a visual image to the target having the highest priority, the information provided by the visual image may be more efficiently utilized by the elderly and weak or the like.

The above description of the illustrative exemplary embodiments is provided for the purpose of illustration, and it would be understood by those skilled in the art that various changes and modifications may be made without changing technical conception and essential features of the illustrative exemplary embodiments. Thus, it is clear that the above-described illustrative exemplary embodiments are illustrative in all aspects and do not limit the present disclosure. For example, each component described to be of a single type may be implemented in a distributed manner. Likewise, components described to be distributed may be implemented in a combined manner.

The scope of the inventive concept is defined by the following claims and their equivalents rather than by the detailed description of the illustrative exemplary embodiments. It shall be understood that all modifications and exemplary embodiments conceived from the meaning and scope of the claims and their equivalents are included in the scope of the inventive concept.

DETAILED DESCRIPTION OF MAIN ELEMENTS

S100: observation operation
S200: selecting operation
S300: control operation

What is claimed is:

1. An operating method of a vehicle lighting device, the operating method comprising:
   an observation operation in which information on a driving environment of a vehicle is observed with an observation unit;
   a selecting operation in which a controller receives the information and selects image data regarding a visual image based on the information; and
   a control operation in which the controller controls a light output unit to output light for displaying the visual image based on the image data, the control operation comprising a sorting operation in which the controller sorts a target as a reference for recognizing the light,
      wherein, in the sorting operation, the controller sorts a driver as the target, but when at least one pedestrian is located within a predetermined distance from the vehicle, the controller sorts the pedestrian, instead of the driver, as the target;
   the control operation further comprising, for the pedestrian:
      a determining operation in which the controller determines a direction in which the pedestrian looks at the light;
      a setting operation in which the controller sets a vanishing point at a point spaced apart from the pedestrian by a second predetermined distance in the direction; and
      an adjusting operation in which the controller adjusts the light output unit so that the visual image is projected in perspective from the pedestrian toward the vanishing point.

2. The operating method of claim 1, wherein the control operation comprises, for the driver:
   a second determining operation in which the controller determines a direction in which the driver looks at the light;
   a second setting operation in which the controller sets a vanishing point at a point spaced apart from the driver by a predetermined distance in the direction; and
   a second adjusting operation in which the controller adjusts the light output unit so that the visual image is projected in perspective from the driver toward the vanishing point.

3. The operating method of claim 2, wherein the sorting operation comprises:
   a classification operation in which the controller, when a plurality of pedestrians are located adjacent to the vehicle, classifies the plurality of pedestrians according to priority; and
   a choosing operation in which the controller selects as the target a highest priority pedestrian having a highest priority, among the plurality of pedestrians classified according to the priority.

4. The operating method of claim 3, wherein, in the classifying classification operation,
   when the plurality of pedestrians form a plurality of groups, the controller gives priority to a group including a larger number of the plurality of pedestrians, and
   in the choosing operation, the controller determines as the highest priority pedestrian any one of the plurality of pedestrians included in the group belonging to the highest priority.

5. The operating method of claim 4, wherein, in the classification operation, when the plurality of groups includes a same number of the plurality of pedestrians, the controller gives priority to a group including the elderly.

6. An operating method of a vehicle lighting device, the operating method comprising:
   an observation operation in which information on a driving environment of a vehicle is observed with an observation unit;
   a selecting operation in which a controller receives the information and selects image data regarding a visual image based on the information;

an input operation in which the controller receives direction information regarding a direction in which the visual image is to be projected; and a control operation in which the controller controls a light output unit to output light for displaying the visual image to be projected based on the image data and the direction information, the control operation comprising a sorting operation in which the controller sorts a target as a reference for recognizing the light, wherein, in the sorting operation, the controller sorts a driver as the target, but when at least one pedestrian is located within a predetermined distance from the vehicle, the controller sorts the pedestrian, instead of the driver, as the target;

the control operation further comprising, for the pedestrian:

a determining operation in which the controller determines a direction in which the pedestrian looks at the light;

a setting operation in which the controller sets a vanishing point at a point spaced apart from the pedestrian by a second predetermined distance in the direction; and an adjusting operation in which the controller adjusts the light output unit so that the visual image is projected in perspective from the pedestrian toward the vanishing point.

7. The operating method of claim 6, wherein, in the control operation, the controller controls the light output unit so that the visual image is rotated by a predetermined angle to be displayed according to the direction in which the visual image is projected.

8. The operating method of claim 7, wherein, in the control operation, the controller controls the light output unit so that the visual image displayed at a short distance is displayed to be brighter than the visual image displayed at a distance.

9. A vehicle lighting device comprising:
an observation module adapted to observe information on a driving environment of a vehicle;
a selecting module for a controller adapted to receive the information and select image data regarding a visual image based on the information; and
a control module for the controller adapted to control a light output unit to output light for displaying the visual image based on the image data,
wherein the control module includes:
a sorting module adapted to sort a pedestrian as a target as a reference for recognizing the light;
a determining module adapted to determine a direction in which the target pedestrian looks at the light;
a setting module adapted to set a vanishing point at a point spaced apart from the pedestrian by a predetermined distance in the direction; and
an adjusting module adapted to adjust the light output unit so that the visual image is projected in perspective from the pedestrian toward the vanishing point.

\* \* \* \* \*